May 19, 1942.   M. S. JOHNSON   2,283,637
BRAKE HEAD LUG AND SOCKET WEAR ELEMENT
Filed Jan. 13, 1941   2 Sheets-Sheet 1

Inventor
Malcolm S. Johnson
By George Heideman
Attorney

May 19, 1942. M. S. JOHNSON 2,283,637
BRAKE HEAD LUG AND SOCKET WEAR ELEMENT
Filed Jan. 13, 1941 2 Sheets-Sheet 2
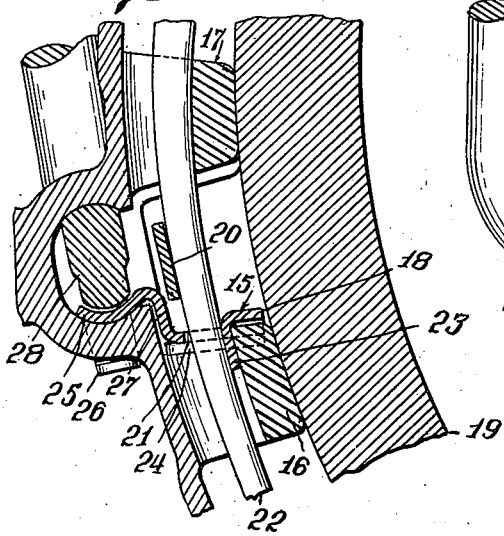
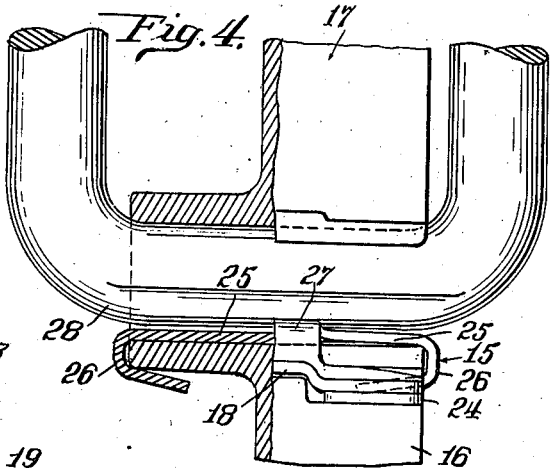
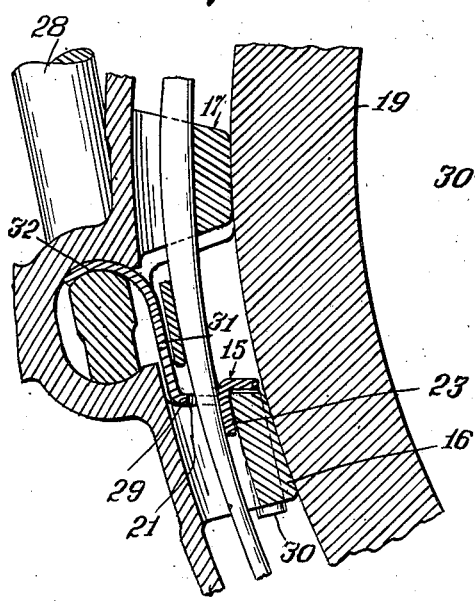
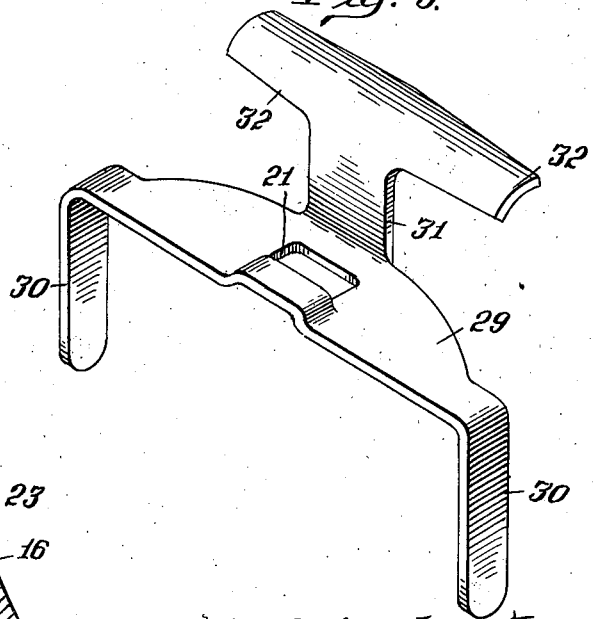
Malcolm S. Johnson, Inventor
By George Heidman
Attorney Patented May 19, 1942

2,283,637

UNITED STATES PATENT OFFICE 2,283,637

BRAKE HEAD LUG AND SOCKET WEAR ELEMENT

Malcolm S. Johnson, Chicago, Ill., assignor to Illinois Railway Equipment Company, Chicago, Ill., a corporation of Illinois Application January 13, 1941, Serial No. 374,272

5 Claims. (Cl. 188—236)

My invention relates to combined wear take-up and wear resisting elements adapted to the standard type of link suspended brake head and brake shoe and has for its object the provision of means which may be easily applied to brake heads in use, whereby wear on the shoe supporting lug will be relieved and the shoe will be firmly supported by the brake head against vibration and whereby the undue play between the brake head and hanger, due to a worn socket in the head, will be eliminated.

My improved single piece element is especially adapted to take up the wear on brake heads in service and to eliminate the resultant play and slaps between the hanger and brake head and which at the same time will prevent disengagement of the brake head from the hanger, while also taking up the wear on the shoe supporting lug of the brake head; the element being adapted to maintain the proper relation between the hanger and the brake head and to provide the comparatively snug relation between the brake head and shoe required by the A. A. R. rules, thus enabling the brake head to be continued in service and eliminating the expense of brake head replacement.

The invention also has for its object the provision of an element which is adapted to brake heads which have encountered varying degrees of wear and which may be easily applied to the brake head and arranged in locking engagement therewith to prevent its loss in the event removal of the brake shoe becomes necessary.

The above enumerated objects and advantages, as well as other advantages inherent in the invention, will all be readily comprehended from the detailed description of the accompanying drawings wherein:

Figure 3 is a vertical sectional view of the intermediate portion of a brake head with my improved element applied; a portion of the shoe also in section and a portion of the shoe locking key also being shown.

Figure 4 is a front elevation of a portion of a brake head and hanger with the wear element applied; a portion of the element and of the brake head being broken away and the latter shown in section.

Figure 5 is a perspective view of a modified form of my improved wear element.

Figure 6 is a vertical sectional view of a brake head and shoe with the modified form of wear element applied and shown in section and a portion of the shoe locking key in elevation.

My improved wear element is adapted for use on the standard type of brake heads at present in use on railroads of this country, being especially intended for the reclamation of worn brake heads and taking care of wear both in the hanger receiving socket and on the shoe supporting lug of the brake head, thereby prolonging the life or usefulness of the head and eliminating the expense of brake head replacement and the attendant loss of car in service.

Brake heads and brake shoes generally consist of more or less rough castings with certain tolerances in manufacture to enable easy insertion of the shoe lug between the vertically spaced lugs of the brake head which are arranged at opposite sides of the throat or opening for insertion of the hanger into the hanger receiving socket of the brake head. As a result it is never possible under such conditions to obtain a tight fit between the brake shoe and the brake head and consequently an undesirable excess play is encountered which permits the shoe to vibrate and causes the wear to rapidly increase in proportion to the amount of play between the shoe and head lugs and allows excess travel of the shoe independently of the head during brake application. As the brake shoes and the brake hanger are of harder metal than the brake head, the lugs of the brake head as well as the throat or opening of the hanger receiving socket become badly worn due to the slaps between hanger and head, in addition to the usual vibration, produced by the constant brake application when cars are moved back and forth, with the result that the extent of the slaps are increased and greater and faster wear takes place. This wear enlarges the hanger receiving opening and permits the head to slip off the hanger and into a position which interferes with proper brake application.

Figure 1:
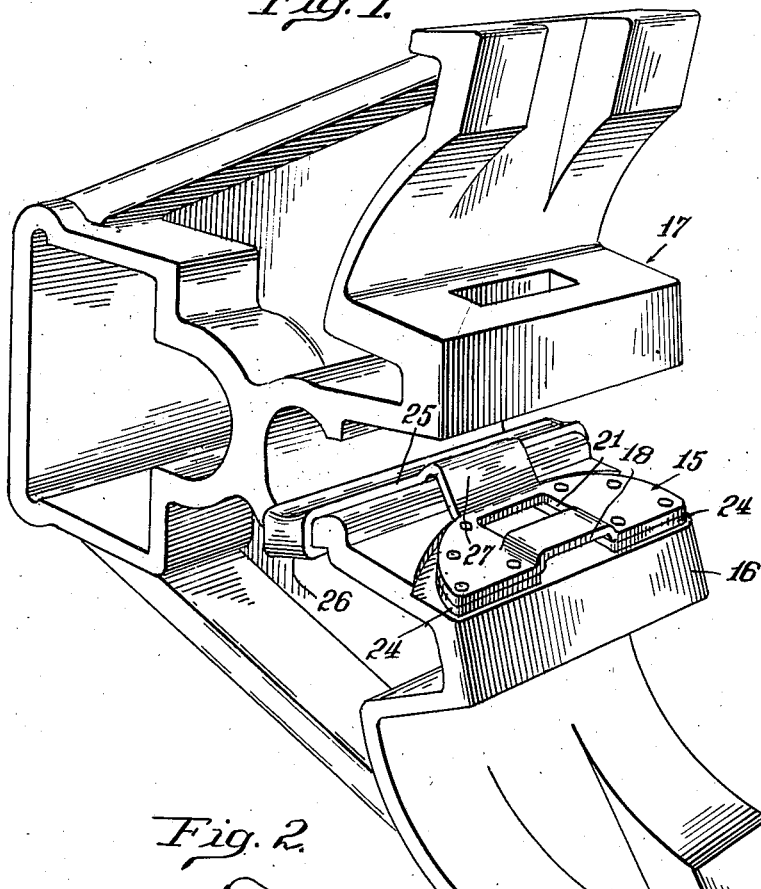
Figure 1 is a perspective view of a brake head with my improved element applied thereto.
Figure 2:
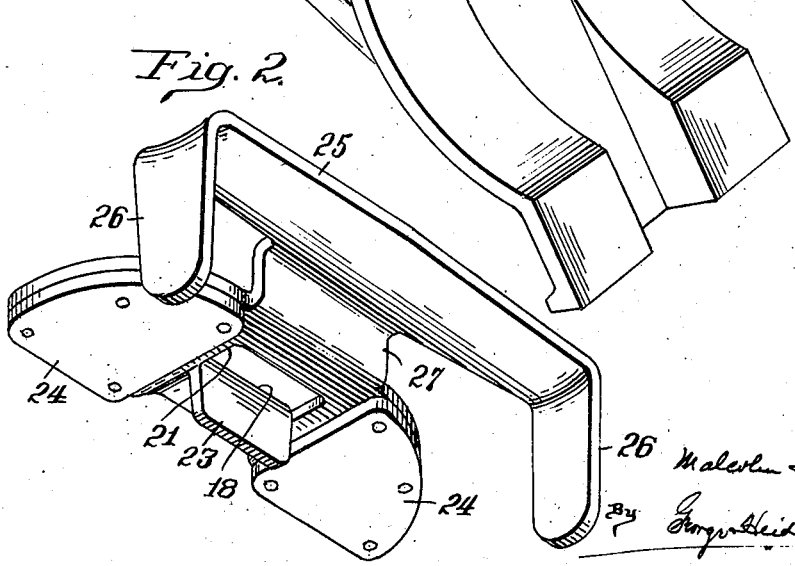
Figure 2 is a perspective view of the wear element as viewed from the lower side.

My invention is designed to obviate the difficulties mentioned and in the embodiment disclosed in Figure 2 is shown stamped out of hard metal or sheet steel to provide the head lug protecting plate portion or section 15 which extends throughout the shoe supporting lug 16 of the brake head 17, as shown in Figure 1. The plate section 15 is provided with a comparatively straight forward edge in keeping with the forward side or face of the head lug and offset vertically intermediate of its ends, as shown at 18, to correspond with the lateral spacing between the lugs of the shoe 19; the shoe lugs, which are generally slightly arcuate at their ends, are provided with the usual connecting strap shown at 20 in Figure 3. In view of the spacing between the shoe-lugs, the head-lug 16 becomes worn on opposite sides of the transverse center thereof and hence the portion 18 of the plate is vertically offset to accommodate the practically unworn part of the head lug and this portion 18 is provided with an opening 21 adapted to register with the usual passage or opening in the head-lug for receiving the locking key 22 whereby the shoe 19 is secured to the head. The opening 21 is preferably made by partially severing the metal of plate section 15 in order to provide a more or less resilient tongue 23, integral with the forward wall of the opening, which is bent downwardly to enter the key receiving opening in the head-lug 16 and effect frictional holding engagement with the shoe locking key 22.

The ends of the plate section 15 at their rear longitudinal edges are shown arcuate to correspond somewhat to the usual curved sides of the shoe lugs, thus adapting the plate section to the depression worn into the head-lug by the shoe lugs.

The element when stamped from sheet metal will be of more or less uniform thickness and may be employed with unworn heads for the purpose of taking up undesirable play between the head and shoe as well as to prevent wear of the head-lug; but in cases where the head-lug has become excessively worn at opposite sides of the key receiving opening, I provide the ends of the plate section 15 with the supplemental sections 24 made of sheet steel and preferably welded to the lower face of plate section 15 as shown in Figure 2. When the element consists of a drop forging, the plate section may be made of increased thickness to take care of the more worn head lugs.

The wear element also involves a hanger socket plate section 25 of length sufficient to extend from end to end throughout the bottom of the hanger socket of the brake head and is provided at its ends with depending legs 26, 26 adapted to overlap the sides of the brake head and to be immovably secured thereto by bending the ends of the legs about the side wall portions of the head at opposite sides of the socket as shown in Figure 1. With the legs 26 bent about the extended side wall portions of the head, it is apparent that the wear element will be firmly locked to the head against movement and misplacement or loss of the element prevented during removal and replacement of the brake shoe.

The plate section 25 preferably is dished or concaved transversely to correspond with the lower curved surface of the hanger receiving socket as shown in Figure 3 and this plate section 25 is united with the lug plate section 15 by the vertically disposed strap section 27 which is formed integral with the rear longitudinal edge of the lug plate section 15, intermediate of its ends, and with the forward longitudinal edge of the hanger socket plate section 25, see Figure 2.

The strap section 27 extends upwardly from the plate section 15 (the upper surface of the head lug 16 being somewhat beneath the throat or opening of the hanger socket) with its upper end curving over the lip at the opening to the socket and downwardly to the dished plate section 25, as shown in Figure 3.

Initially the brake heads are made with oppositely disposed lips at the opening to the socket so as to prevent the hanger, the lower end whereof is shown at 28, moving out of the socket when in suspended position. The hanger, which is of harder metal than the cast brake head, has more or less play in the socket and consequently, in addition to the usual vibration, there is slapping action between the hanger and brake head as a result of frequent brake application when cars are moved back and forth which produces an up and down slap on the brake beam and head which in turn increases the wear on the head and particularly at the orifice or throat of the hanger socket, thereby increasing the orifice or throat and allowing the hanger to move out of the socket toward the rear of the shoe. This permits the brake beam to drop or move downwardly out of proper brake applying position and in the event of loss of the shoe to drop on the rail and cause derailment or serious difficulty.

With my improved wear element, the undesirable play between the hanger and brake head is prevented and a restricted opening at the side of the socket is maintained, as clearly shown in Figure 3, which prevents the hanger moving out of the socket. As my improved wear element (through the addition of the supplemental sections 24, or in the case of a drop forging by increasing the thickness of the ends of the plate section 15) is also adapted to worn heads, it is apparent that the restricted opening to the hanger socket is restored and disengagement of the head from the hanger prevented in the event of loss of the brake shoe, as the wear element is firmly held on the head by bending the lower ends of the legs 26 beneath the flanges or ribs on the sides of the head in the manner shown in Figures 1 and 4.

In Figures 5 and 6, I show a modification of the wear element whereby the hanger slack is taken up at the hanger bearing portion of the hanger socket. The wear element consists of a lug section 29 which is substantially similar in construction to the lug section 15 shown in Figure 2 so as to conform to the shoe lug engaging portions of the head lug 16 except that it is not shown provided with the supplemental wear take-up sectoral portions or plates 24 and the ends of the lug section 29 are provided with the depending legs 30, 30 which are adapted to engage the opposite sides of the head lug 16 and their lower ends then bent beneath the head lug 16 after the element has been applied, as shown in Figure 6.

The wear element, as illustrated in Figure 5, is adapted for use on an unworn or new brake head to prevent wear on the brake head and also to take up the initial play between the head lug and the shoe lug. The lug section 29 is centrally provided with a locking key receiving opening 21 with the depending resilient tongue 23 at the forward side of the opening 21 and the rear longitudinal edge is provided with an integral upstanding strap section 31 which terminates at its upper end in the hanger socket section 32 curved transversely to fit the upper side of the hanger receiving socket in the brake head, as shown in Figure 6, and hence provide bearing for the hanger 28. With this construction the slack between the hanger and the brake head and wear at the top of the socket in the brake head are not only taken care of but the strap section 31 provides a closure for the throat or opening of the socket and prevents disengagement of the head from the hanger.

As previously stated, the wear element may consist of a stamping of sheet metal and hence of more or less uniform thickness so that in instances where the brake head has become excessively worn the thickness of the ends of the lug section are increased by adding the supplemental sectoral sections as shown in Figure 2; or the wear element may be a forging with the lug sections made of the desired thickness. The element thus not only affords a reclamation of worn brake heads but also prolongs the life of brake heads, as the element takes care of wear at the two points where most wear is encountered; my improved wear element in either instance being immovably locked in place by bending the lower ends of the depending legs at the sides of the brake head as shown in Figure 1 or beneath the lug as shown in Figure 6; while the resilient tongues 23 (which initially extend slightly into the path of the locking key) are flexed downwardly when the shoe locking key 22 is driven into place and maintain a frictional binding relation with the key and thus prevent its accidental removal.

I have shown and described what are believed to be the simplest embodiments of my invention but structural modifications are possible and may be made without, however, departing from the spirit of my invention as defined in the appended claims.

What I claim is:

1. A wear element for brake heads comprising a single piece member composed of a laterally disposed plate section coextensive with and adapted to extend across the shoe supporting lug of a brake head, a second rearwardly off-set plate section adapted to extend into the hanger socket of the brake head and connected with the first mentioned section intermediate the ends, and a locking section adapted to effect holding engagement with the brake head.

2. A wear element for brake heads comprising a single piece member composed of a lower plate section adapted to seat on the shoe supporting lug of a brake head, an upper transversely arcuate plate section adapted to extend into the hanger socket of the brake head in contact with one side of the socket and integrally connected intermediate the ends with the first mentioned section by an upwardly disposed hanger socket restricting portion, and depending leg sections at the ends of the member adapted to effect holding engagement with the brake head.

3. A wear element for brake heads comprising a laterally elongated lower plate section provided with a locking key receiving opening and adapted to seat on the shoe supporting lug of a brake head, an upper plate section of arcuate cross-section adapted to extend into the hanger socket of the brake head and off-set rearwardly of the vertical plane of the lower section, a vertically disposed strap section integral with the upper and the lower sections, and integral means for effecting holding engagement with the brake head.

4. A wear element of the character described comprising a single piece member composed of an elongated lower plate section adapted to seat on the shoe supporting lug of a brake head and having a key receiving opening, an elongated upper plate section of arcuate cross-section adapted to extend lengthwise of the hanger socket of the brake head, an intermediate vertically disposed section integral with the rear longitudinal edge of the lower section and with the forward longitudinal edge of the upper section, and means integral with the ends of one of the elongated sections adapted to effect locking engagement with the sides of the brake head.

5. A single piece wear element of the character described comprising a plate section provided with a shoe locking key receiving opening and adapted to extend across the lug of a brake head, and a rearwardly off-set hanger socket entering plate section provided with bendable end portions adapted to effect holding engagement with the sides of the brake head said sections being connected intermediate their ends by a vertically disposed strap.

MALCOLM S. JOHNSON.